Figure 1:
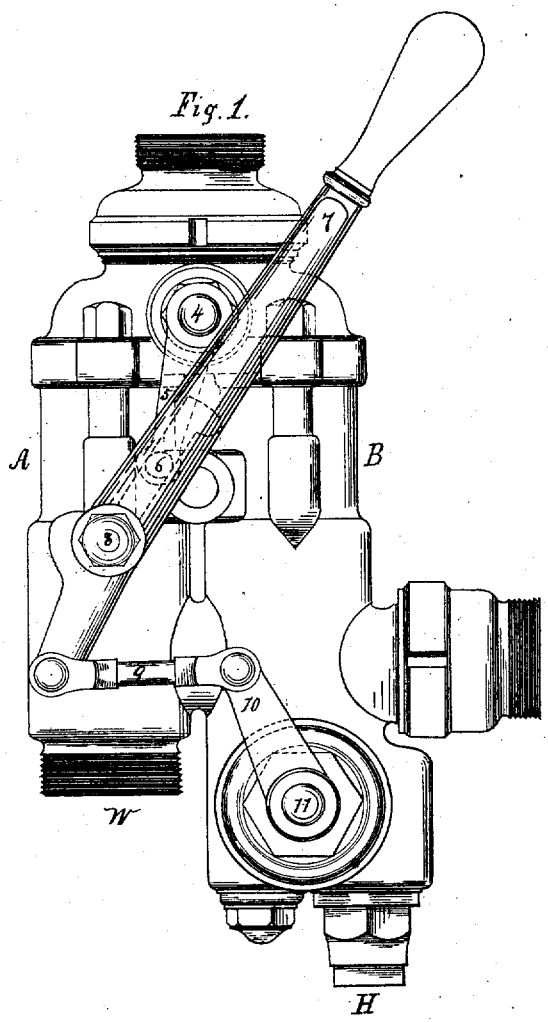

2 Sheets—Sheet 1.

W. R. PARK,

Assignor to THE HANCOCK INSPIRATOR COMPANY.

Inspirator.

No. 8,734. Reissued June 3, 1879.

*Witnesses,*

Wm. C. Greene

Jacob Oppenheimer.

*Inventor,*

Wm. R. Park by J. H. Adams

Atty.

N. PETERS, PHOTO-LITHOGRAPHER, WASHINGTON, D. C.

W. R. PARK,
Assignor to THE HANCOCK INSPIRATOR COMPANY.
Inspirator.
No. 8,734. Reissued June 3, 1879.
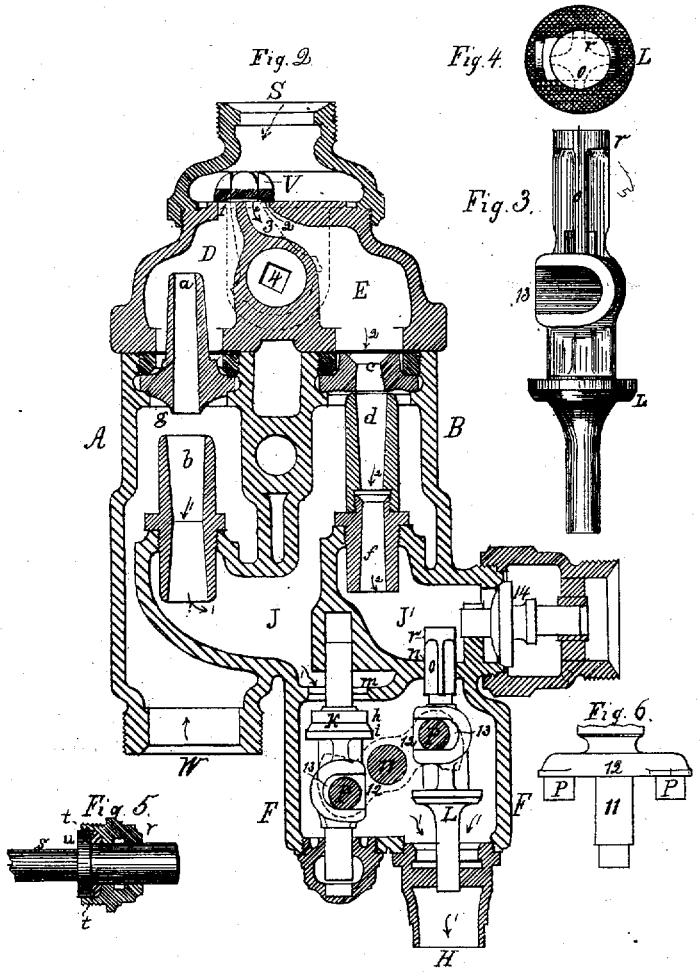
Witnesses,
Wm. C. Greene
Jacob Oppenheimer.
Inventor,
Wm. R. Park
by J. H. Adams
Atty.
N. PETERS, PHOTO-LITHOGRAPHER, WASHINGTON, D. C.

UNITED STATES PATENT OFFICE.

WILLIAM R. PARK, OF BOSTON, MASSACHUSETTS, ASSIGNOR TO THE HANCOCK INSPIRATOR COMPANY, OF SAME PLACE.

IMPROVEMENT IN INSPIRATORS.

Specification forming part of Letters Patent No. 212,620, dated February 25, 1879; Reissue No. 8,734, dated June 3, 1879; application filed May 7, 1879.

*To all whom it may concern:*

Be it known that I, WILLIAM R. PARK, of Boston, in the county of Suffolk and State of Massachusetts, have invented an Improvement in Inspirators, of which the following is a specification.

My invention relates to certain improvement in an inspirator for which a patent was granted to J. T. Hancock January 2, 1877, numbered 185,861. In the said patent four distinct and separate motions were necessary to be made to start the apparatus.

By my improvement I am enabled to operate all the valves necessary to start the appatus by means of a single lever.

My invention consists in so constructing and arranging the connections of the several valves that they are all actuated by one continuous motion of a single lever, so that each valve shall act at the proper moment to set the apparatus in operation.

The invention also consists in the interposition between the discharge-conduit and the final overflow-valve of a supplementary valve, forming a part of the said overflow-valve connection, and so constructed and arranged as to relieve the latter of the pressure which would be occasioned by the force of the water if concentrated upon the said overflow-valve.

The invention also consists in the method of actuating the two overflow-valves at one operation by means of a tumbling-shaft, so constructed and arranged as to cause the said valves to open and close each at the proper moment to insure their ready co-operation with the ingress steam-valve.

The invention further consists in the cylindrical elongation of one of the overflow-valves, for the purpose of partially closing the valve-opening, so as to cause the water to flow through the combining-tube and the supplementary valve-opening to the final overflow-valve, and allow of a further movement of the first-named valve, in order that both valves may be brought to their seats at, or nearly at, the same moment.

Referring to the drawings, Figure 1 represents a side elevation of an apparatus embodying my improvements. Fig. 2 is a vertical section of the same; and Figs. 3, 4, 5, and 6 are enlarged views, in detail, of different portions of the apparatus.

The main apparatus is of the same general construction as that shown and described in Patent No. 185,861, hereinbefore mentioned.

A and B are two cylindrical casings, connected together and cast in one piece. The casing A contains the apparatus for lifting the water, and B the apparatus for transmitting the water to the boiler.

S is the opening, to be connected with a pipe leading from the boiler, for the admission of steam. W is the water-inlet.

Instead of a circular valve I employ a slide-valve, V, covering the two ports 1 and 2, and actuated by an arm or lever, 3, on shaft 4, on the outer projection of which is an arm, 5, (shown in Fig. 1,) provided on its free end with a projection, 6, fitting in a recess in the lever 7, as shown.

The lever 7, which moves the system of levers that actuate the valves, is fulcrumed on the casing A at 8, and to its lower end is pivoted a connecting-arm, 9, attached to the end of a lever-arm, 10, which latter is connected to a tumbling-shaft, 11, that actuates the two overflow-valves.

D and E are the two steam-chambers. (See Fig. 2.) In chamber D is a conical pipe or passage, *a*, having its larger diameter at the lower end.

Below the passage *a* is a double conical tube, *b*, a space, *g*, being left between *a* and *b*. The lower end of tube *b* is open, and terminates in the conduit J.

In the lower part of the steam-chamber E is fitted the conical tube *c*, below which is the conical tube *d*, its smaller diameter being at the bottom, and a space being left between the two to admit of the passage of water or steam into tube *d* from the main chamber of casing B. Below the tube or passage *d* is the tube *f*, enlarged at its lower end and opening into the conduit J′, as shown in Fig 2.

In the lower part, F, of the prolongation of casing B are arranged the two overflow-valves K and L, which are operated by means of a tumbling-shaft, 11, connected to the lever-arm 10, the latter being actuated through the connecting-arm 9 by the main operating-lever 7.

Forming a part of the tumbling-shaft 11, and extending each side of the same, is an arm or bar, 12. (Shown in Figs. 2 and 6.) On each end of the bar 12 is a projection, P P, which fit respectively in recesses 13 of each valve-stem, the one fitting snugly in the recess in the stem of valve L, and the other fitting so as to allow of a little play in the stem of valve K, so as to cause valve L to open in advance of valve K, and thus lessen the pressure which would otherwise be exerted in opening both valves simultaneously.

The valve K, fitting in the opening *m*, is constructed with a cylindrical elongation, *h*, above the seat *i*, by means of which the valve-opening is partially closed, and the water is caused to flow through the combining-tube *d* and the supplementary valve-opening *n* to the final overflow-valve, and both valves will be brought to their seats at, or nearly at, the same moment.

On the upper portion of the stem of valve L is a winged guide, *o*, fitting in an opening, *n*, in the bottom of conduit J′, and surmounted by a solid cylindrical head, *r*, which serves as a supplementary valve, and when closed in the opening *n* causes the water in J′ to pass to the boiler. The solid head *r*, being of less area than the valve L, enables it to be easily controlled against the high pressure exerted by the flow of water, which, if concentrated upon the valve L, would render the latter difficult to be controlled by the main actuating-lever. 14 represents the check-valve in the passage leading to the boiler.

Fig. 5 represents a portion of the spindle which actuates the slide-valve V, and also that of the tumbling-shaft 11.

*v* is a nut which fits over or upon the spindle and the flange or shoulder *u*. *t* is a washer, made of soft metal, rubber, or other suitable material. It is made flat on one side, which has a bearing against the shoulder *u*, and convex on the opposite side, so as to fit snugly within a corresponding recess in the nut *v*, and thus adapt itself to any irregular motion of the shaft, always filling its seat in the said recess.

Operation: Upon first moving the lever 7 the valve V is caused to uncover port 1 to admit steam to the chamber D, the valves K and L being open. The steam then passes through the tube *a* into tube *b*, and thence to conduit J, through valve-opening *m*, into chamber F, and thence through the opening of valve L, making its exit, unless condensed during its passage, through the waste-pipe H to the atmosphere. The flow of steam across the interval or space *g* between the tubes *a* and *b* soon exhausts the air in casing A and the pipes connecting with the water-supply. The water then ascends and condenses the steam, and fills the conduit J and chamber F, through valve-opening *m* of valve K.

By continuing the motion of lever 7 the port 2 is uncovered, and the elongated cylindrical portion *h* of valve K enters the opening *m*, and upon the further movement of valve K the flow of water is sufficiently checked to cause it to pass upward into casing B, and into and through tube *d* to conduit J′, and thence to opening *m*, in which are fitted the winged guide *o* and the supplementary valve *r*.

A further continued movement of lever 7 causes the supplementary valve *r* to close the opening *n*, so as to direct the flow of water to the boiler, the steam at the same time passing from chamber E through tubes *c*, *d*, and *f*. The final movement of the lever 7 serves to bring the valves K and L to their seats, which sets the apparatus in full operation.

What I claim as my invention, and desire to secure by Letters Patent, is—

1. The combination of an ingress-valve, V, and the overflow-valves K and L with the lever 7 and its connecting arms, so that the said valves may all be operated by a single continuous movement of the lever, substantially as set forth.

2. In an inspirator constructed substantially as shown, a supplementary valve constructed as described, and interposed between the discharge-conduit and the overflow-valve, substantially as and for the purpose set forth.

3. In an inspirator constructed substantially as shown, the combination of the valves K and L, the shaft 11, provided with the arm 12, and projections P P, fitting in recesses in the stems of said valves, substantially as described.

4. The combination, with the conduit J and chamber F, of the valve K, constructed as shown, in connection with the vibrating arm 12 and projections P, substantially as and for the purpose specified.

5. In an inspirator substantially such as described, an overflow-valve, K, having a cylindrical elongation, *h*, in combination with the valve-opening *m*, substantially as and for the purpose set forth.

6. In an inspirator constructed substantially as described, a cylinder, *h*, in combination with the overflow-valves K and L, when operating substantially as and for the purpose specified.

In testimony whereof I have signed my name to this specification in the presence of two subscribing witnesses.

WM. R. PARK.

Witnesses:
FRANK D. HEATH,
JACOB OPPENHEIMER.